US012565898B1

(12) United States Patent
Zhu

(10) Patent No.: US 12,565,898 B1
(45) Date of Patent: Mar. 3, 2026

(54) STEPLESS REGULATION FAN

(71) Applicant: Guangdong Aoyun Technology Co., Ltd., Huizhou (CN)

(72) Inventor: Xueping Zhu, Huizhou (CN)

( * ) Notice: Subject to any disclaimer, the term of this patent is extended or adjusted under 35 U.S.C. 154(b) by 0 days.

(21) Appl. No.: 19/184,395

(22) Filed: Apr. 21, 2025

Related U.S. Application Data

(63) Continuation-in-part of application No. 18/818,066, filed on Aug. 28, 2024, now Pat. No. 12,281,655.

(51) Int. Cl.
*F04D 27/00* (2006.01)
*H02P 7/03* (2016.01)

(52) U.S. Cl.
CPC .............. *F04D 27/004* (2013.01); *H02P 7/05* (2016.02); *H02P 2203/09* (2013.01)

(58) Field of Classification Search
CPC ....... F04D 27/004; H02P 7/05; H02P 2203/09
See application file for complete search history.

(56) References Cited

U.S. PATENT DOCUMENTS

| | | | | |
|---|---|---|---|---|
| 2005/0068001 A1* | 3/2005 | Skaug | ..................... | H02M 1/10 |
| | | | | 318/807 |
| 2006/0214426 A1* | 9/2006 | Asao | ....................... | H02P 9/305 |
| | | | | 290/31 |

| | | | | |
|---|---|---|---|---|
| 2012/0212166 A1* | 8/2012 | Merkel | .................... | F24F 11/77 |
| | | | | 318/400.08 |
| 2015/0187521 A1* | 7/2015 | Chu | ..................... | H01H 19/115 |
| | | | | 200/4 |
| 2016/0294312 A1* | 10/2016 | Tsumura | ........... | H10D 62/8325 |
| 2019/0288623 A1* | 9/2019 | Zuo | ........................... | H02P 7/29 |
| 2022/0042517 A1* | 2/2022 | Lazar | .................... | F04D 29/403 |
| 2022/0123672 A1* | 4/2022 | Yang | ..................... | F04D 27/004 |
| 2022/0356882 A1* | 11/2022 | Lin | ....................... | F04D 27/004 |
| 2023/0243368 A1* | 8/2023 | Zhu | ..................... | F04D 25/0693 |
| | | | | 415/213.1 |

FOREIGN PATENT DOCUMENTS

JP        2011038507 A  *  2/2011

* cited by examiner

*Primary Examiner* — Zoheb S Imtiaz
(74) *Attorney, Agent, or Firm* — Hemisphere Law, PLLC

(57) ABSTRACT

A stepless regulation fan includes a fan main body, a main control circuit, a stepless regulation element electrically connected with the main control circuit and a first driving circuit. The fan main body is equipped with a first motor and fan blades connected to the first motor. The control circuit board integrates the main control circuit, a stepless regulation element electrically connected with the main control circuit and a first driving circuit. The stepless regulation element is configured for user operation. The first driving circuit is electrically connected to the first motor. The stepless regulation element includes an encoder switch, the encoder switch includes a first pin and a second pin, the first pin and the second pin are electrically connected with the main control circuit.

19 Claims, 14 Drawing Sheets

STEPLESS REGULATION FAN

CROSS-REFERENCE TO RELATED APPLICATIONS

This application is a Continuation-in-Part of the U.S. application Ser. No. 18/818,066 filed on Aug. 28, 2024, and entitled "STEPLESS REGULATION FAN" now pending, the entire disclosures of which are incorporated herein by reference.

TECHNICAL FIELD

The present invention relates to the technical field of fans, particularly to a stepless regulation fan.

BACKGROUND

As is well known, fans are devices used for cooling. At present, the existing fans generally use buttons to adjust airflow. The air speed of the fan usually includes three levels, with the first level having a low air speed, the second level having a medium air speed, and the third level having a high air speed. In the mode of speed levels, the air speed cannot be freely adjusted, which affects the user experience.

SUMMARY

The main purpose of the present invention provides a stepless regulation fan for solving the problem that existing fans cannot freely adjust an air speed.

In order to solve the above technical problem, the following technical solution is provided by the present invention.

A stepless regulation fan includes a fan main body, a main control circuit, a stepless regulation element and a first driving circuit. The fan main body includes a first motor and fan blades connected to the first motor. The main control circuit is electrically connected with a stepless regulation element and a first driving circuit respectively. The first driving circuit is electrically connected to the first motor.

The stepless regulation element includes an encoder switch, the encoder switch includes a first pin and a second pin, the first pin and the second pin are both electrically connected with the main control circuit.

When the encoder switch is operated, the first pin or the second pin feeds back a first electrical signal or a second electrical signal to the main control circuit, the main control circuit controls the first driving circuit to output a rotational speed control signal according to the first electrical signal or the second electrical signal, whereby controlling the continuous change of the driving power output from the first motor.

The present invention has the following beneficial effects. Compared with the prior art, in the present invention, the stepless regulation element is configured for user operation, and when the stepless regulation element is operated, a signal is fed back to the main control circuit at real time by the stepless regulation element. The main control circuit adjusts the power output to the first interface through the first driving circuit based on the signal fed back by the stepless regulation element, that is, the power output to the first motor is adjusted to adjust the speed of the fan blades. In this way, the user can adjust the air speed of the fan blades according to their needs, thereby solving the problem of existing fans not being able to freely adjust the air speed, improving operational performance, and enhancing user experience.

BRIEF DESCRIPTION OF THE DRAWINGS

Implementations of the present invention will now be described, by way of embodiment, with reference to the attached figures. It should be understood, the drawings are shown for illustrative purpose only, for ordinary person skilled in the art, other drawings obtained from these drawings without paying creative labor by an ordinary person skilled in the art should be within scope of the present invention.

DETAILED DESCRIPTION OF THE EMBODIMENTS

Figure 1:
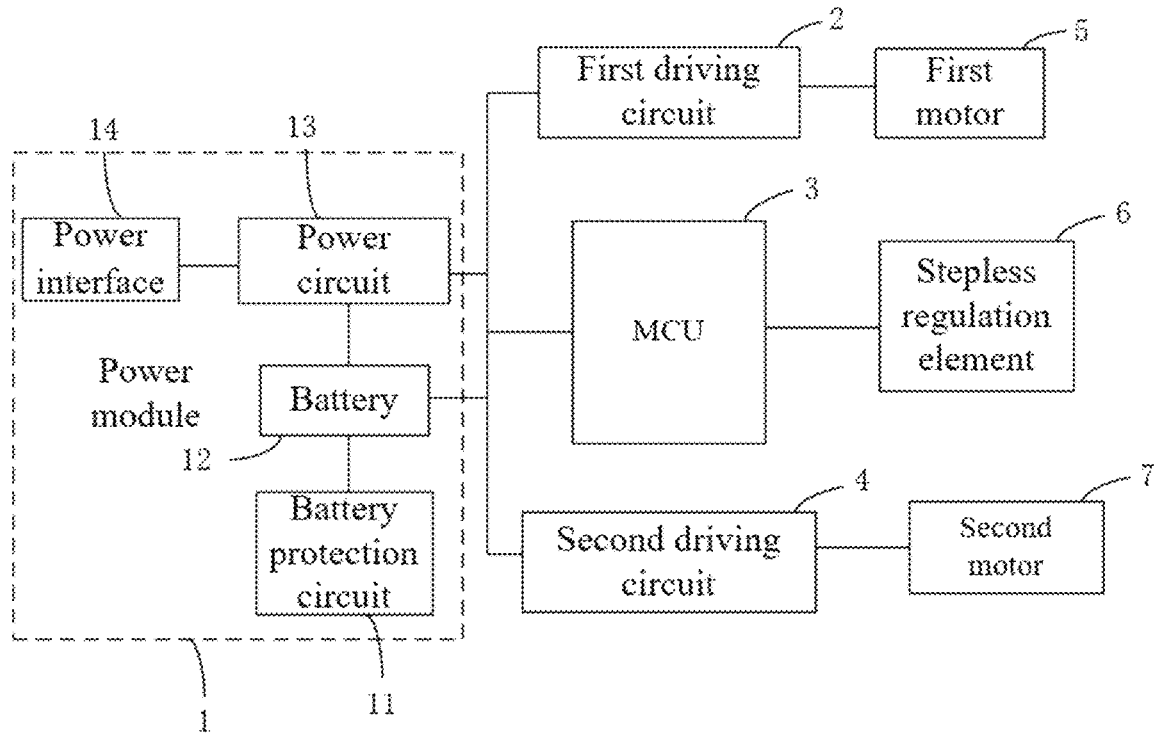
FIG. 1 is a principal block diagram of a fan of the present invention.
Figure 2:
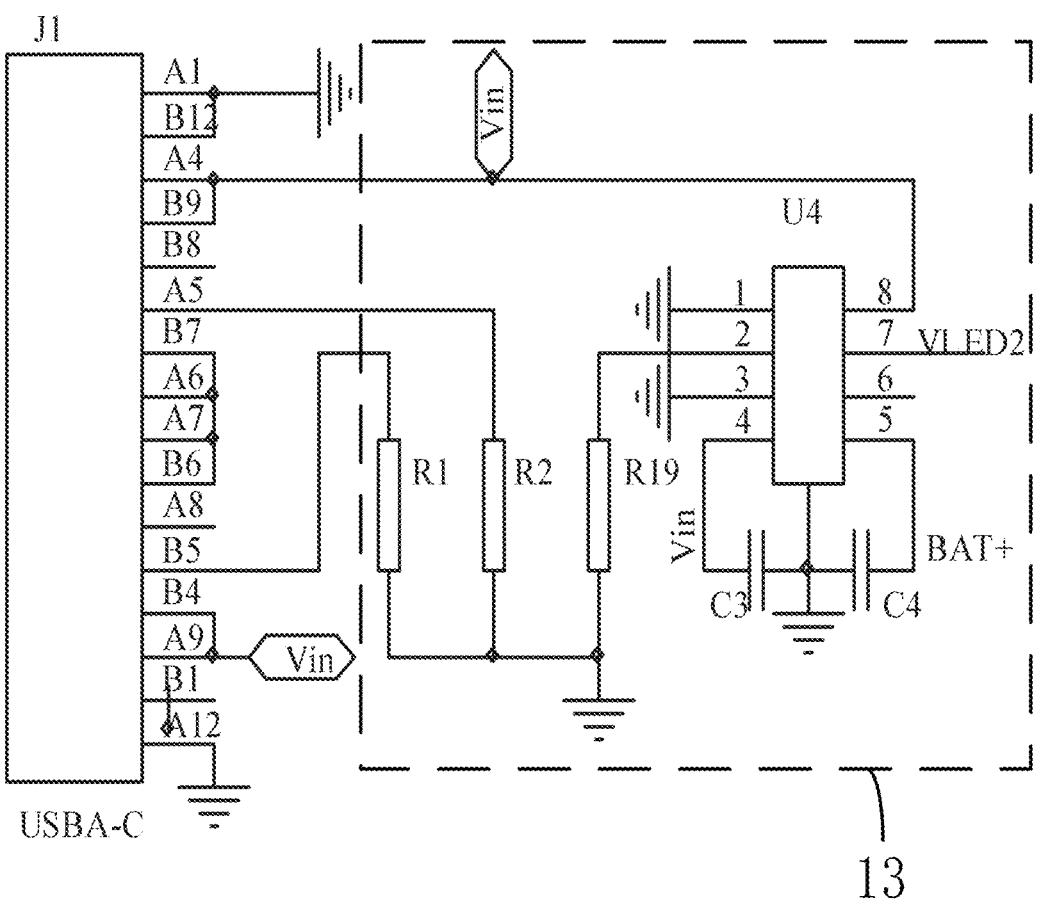
FIG. 2 is a circuit diagram of a connection between a power circuit and a power interface of the present invention.
Figure 3:
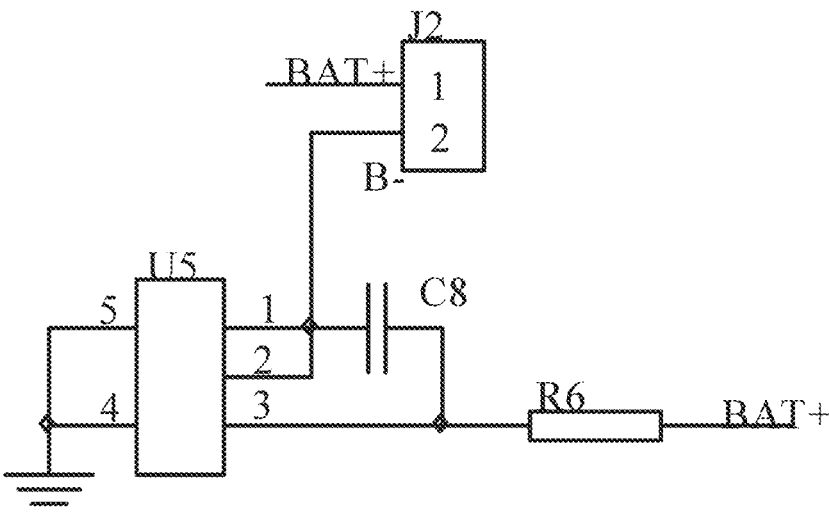
FIG. 3 is a circuit diagram of a battery protection circuit of the present invention.
Figure 4:
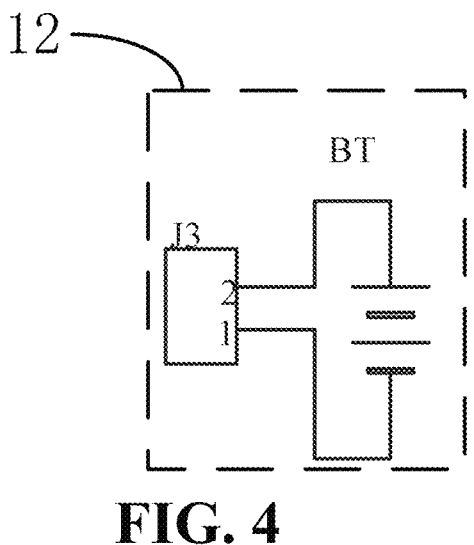
FIG. 4 is a circuit diagram of a battery of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present invention.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

FIGS. 1-11 shows a stepless regulation fan in an embodiment of the present invention.

The stepless regulation fan includes a fan main body 100 and a control circuit board 200. The fan main body 100 is equipped with a first motor 5 and fan blades 9 connected to the first motor 5. The control circuit board 200 includes a main control circuit 3, a stepless regulation element 6 and a first driving circuit 2. The stepless regulation element 6 and the first driving circuit 2 are both electrically connected to the main control circuit 3. The stepless regulation element 6 is configured for user operation, and the first driving circuit 2 is electrically connected to the first motor 5. When the stepless regulation element 6 is operated, a stepless regulation signal within a preset regulation range is fed back to the MCU. Based on the stepless regulation signal, the main control circuit 3 outputs a rotating speed control signal according to the stepless regulation signal to the first driving circuit 2. The first driving circuit 2 adjusts driving power output to the first motor based on the rotating speed control signal. The main control circuit 3 can be a main control chip, such as a MCU.

In this embodiment, the stepless regulation element 6 is configured for user operation, and when the stepless regulation element 6 is operated, a continuously increasing or decreasing stepless regulation signal within a preset regulation range is fed back to the main control circuit 3. The main control circuit 3 adjusts the power output from the first driving circuit 2 to the first motor 5 according to the stepless regulation signal, so that the power output to the first motors 5 increases or decreases continuously, to achieve stepless regulation of a rotating speed of the fan blades 9. In this way, the user can adjust the air speed of the fan blades 9 as required, thereby solving the problem existing fans cannot freely adjust the air speed, improving operational performance, and enhancing user experience.

In one embodiment, the stepless regulation element 6 is a potentiometer. The potentiometer includes a base 63, a movable member 61, a resistance wire 62, a first pin 66, a second pin 65, a third pin 64, and a slider 67. The resistance wire 62, the first pin 66, the second pin 65, the third pin 64, and the slider 67 are all arranged on the base 63. The movable member 61 is rotatably or slidably disposed on the base 63. The movable member 61 is connected to the slider 67. The slider 67 is electrically connected to the second pin 65, and the slider 67 is in contact with the resistance wire 62.

Two ends of the resistance wire 62 are electrically connected to the first pin 66 and the third pin 64 respectively. The third pin 64 is grounded, and the first pin 66 is electrically connected to the main control circuit 3. The slider 67 moves when the movable member 61 is operated, so that a resistance connected to the main control circuit 3 can be adjusted, that is, the resistance connected to the main control circuit 3 is continuously increased or decreased, to fed back the stepless regulation signal within the preset regulation range to the main control circuit 3. Based on an electrical signal, the main control circuit 3 can output a rotating speed control signal that matches the stepless regulation signal to the first driving circuit 2, to adjust the power output to the first motor 5.

Figure 7:
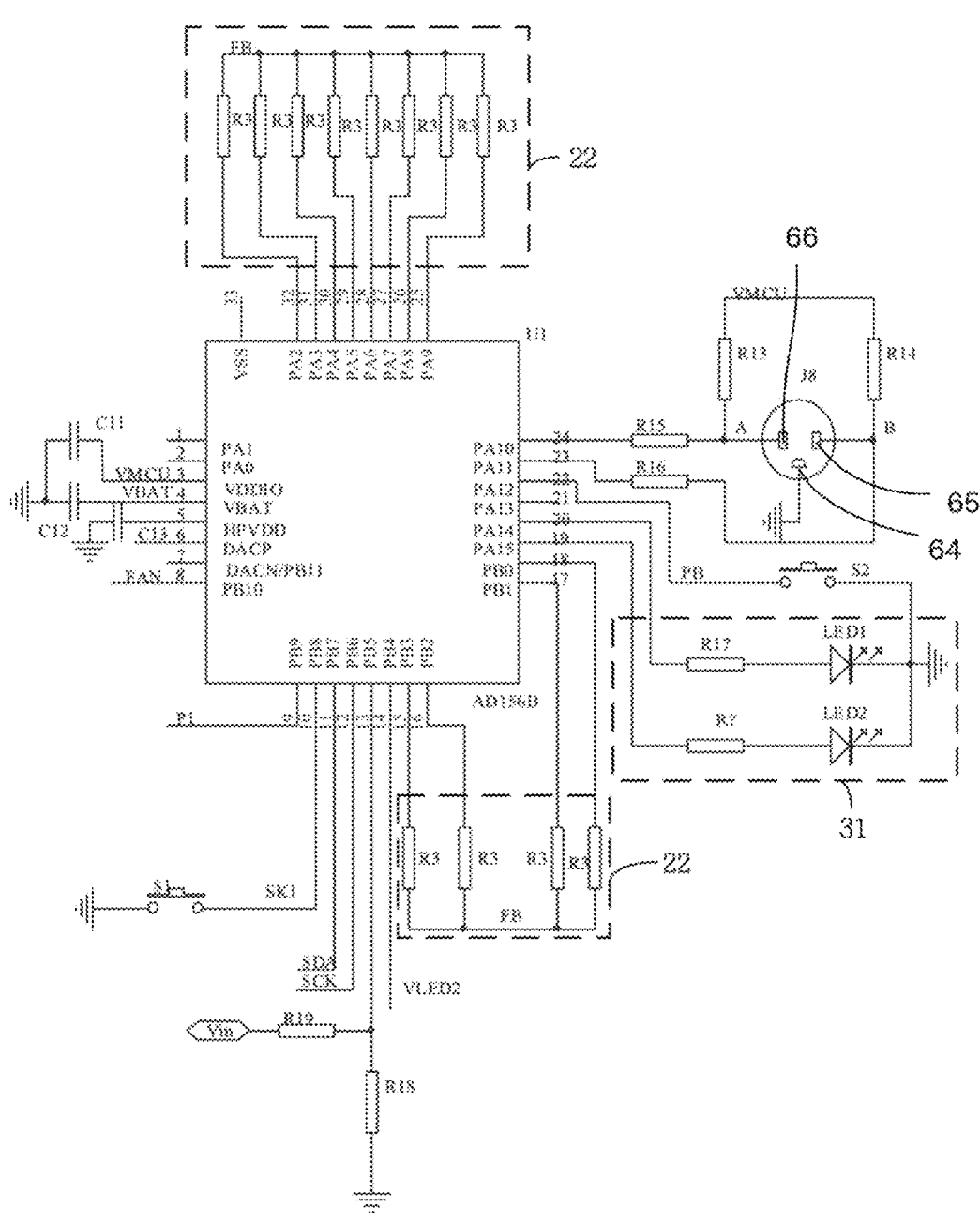
FIG. 7 is a circuit diagram in which a main control circuit is connected to a power indication circuit and a stepless regulation element according to the present invention.
Figure 8:
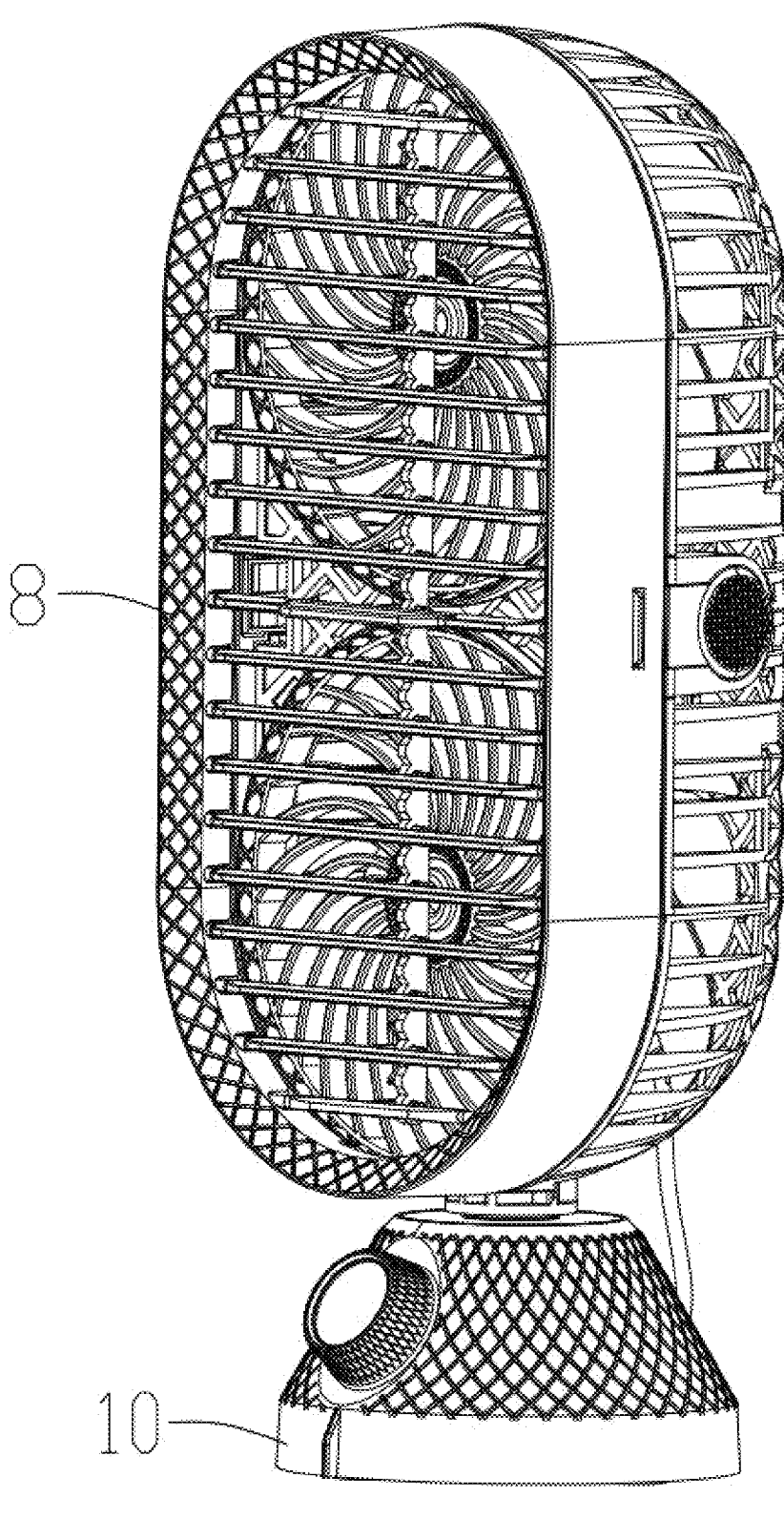
FIG. 8 is a perspective view of a fan of the present invention.
Figure 9:
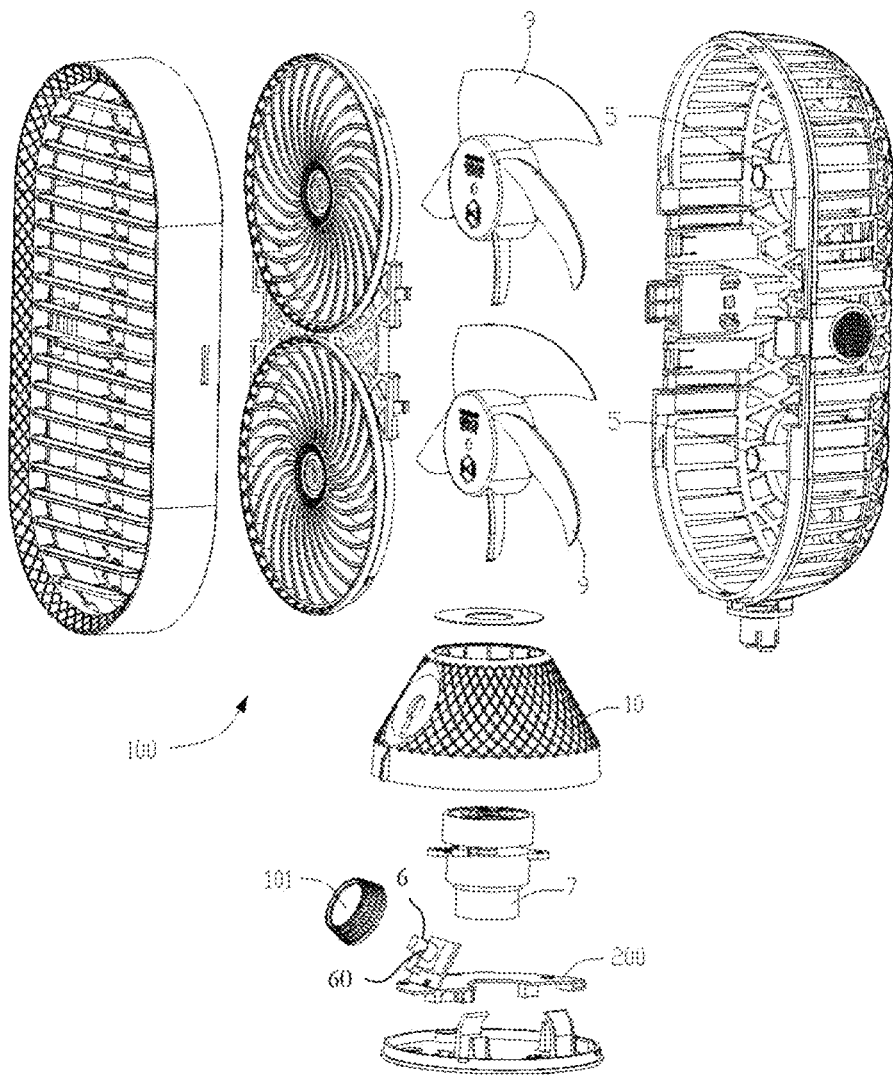
FIG. 9 is an exploded view of the fan of the present invention.
Figure 10:
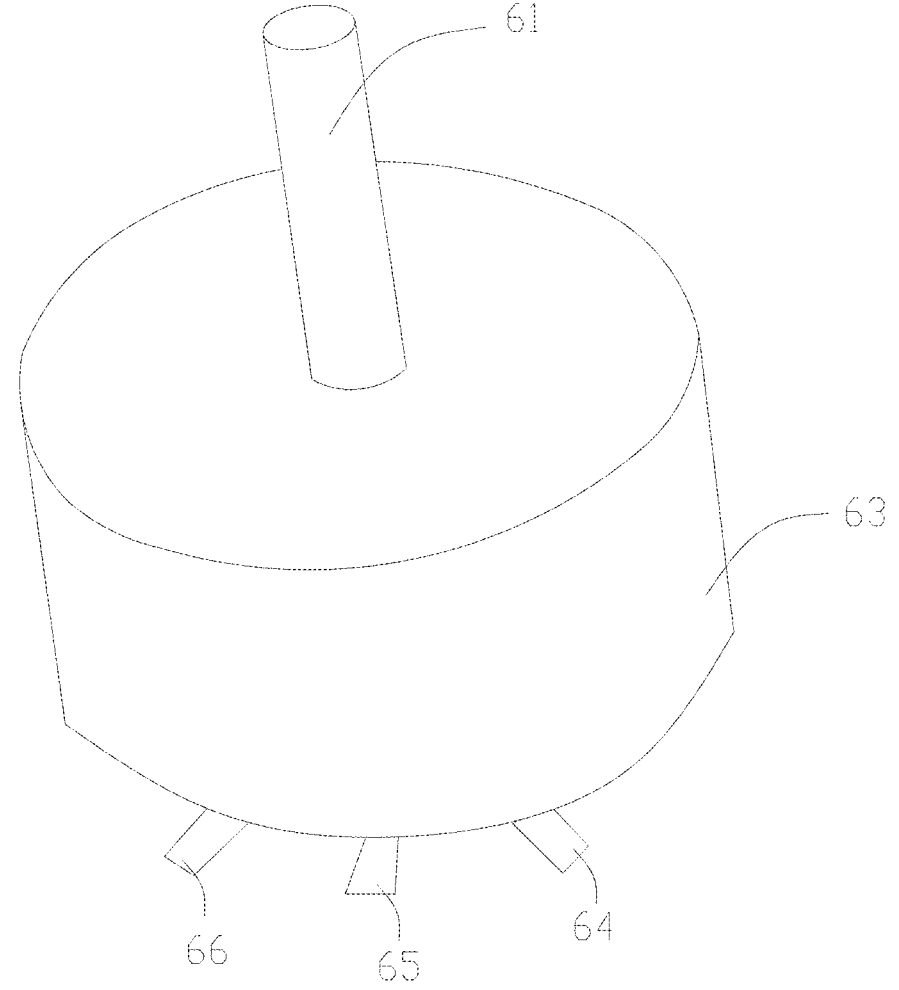
FIG. 10 is a schematic diagram of a potentiometer of the present invention.
Figure 11:
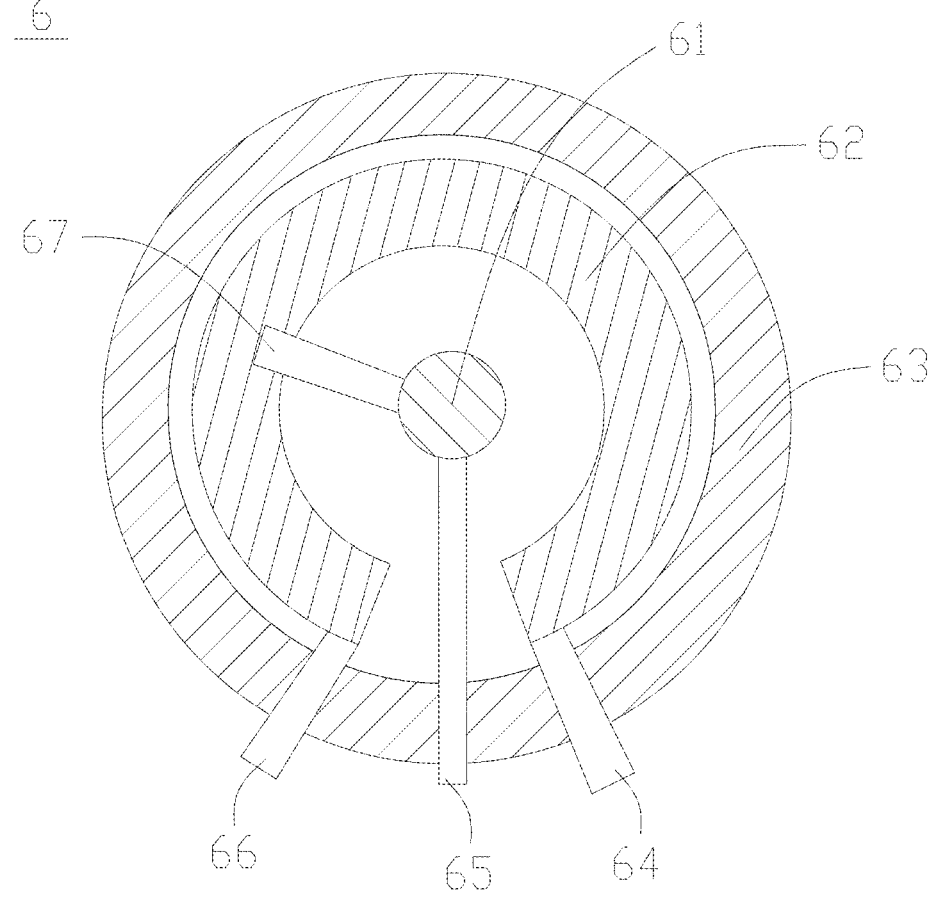
FIG. 11 is a structural diagram of the potentiometer of the present invention.

In one embodiment, referring to FIG. 7, the stepless regulation element 6 is an encoder switch, specifically it can be a rotary encoder switch. The rotary encoder switch includes a first pin 66, a second pin 65 and a third pin 64. The first pin 66 and the second pin 65 are both electrically connected to the main control circuit 3, the third pin 64 is grounded. When the rotary encoder switch is rotated, the first pin 66 and the second pin 65 respectively feed back a continuously changing first electrical signal and a continuously changing second electrical signal to the main control circuit 3. The stepless regulation signal includes the first electrical signal and the second electrical signal. The main control circuit 3 outputs the rotating speed control signal to the first driving circuit 2 according to the changes of the first electrical signal and the second electrical signal, to adjust the power output to the first motors 5 and achieve stepless regulation of the rotating speed of the fan blades 9, thereby effectively solving the problem of limited air speed levels in existing fans, and meeting the user's demand for free adjustment of air speed. Furthermore, when the encoder switch is operated, the first pin 66 or the second pin 65 feeds back the first electrical signal or the second electrical signal to the main control circuit 3, the main control circuit 3 controls the first driving circuit 2 to output a rotational speed control signal according to the first electrical signal or the second electrical signal, whereby controlling the continuous change of the driving power output from the first motor 5, thereby the rotational speed of the first motor 5 and the fan blades 9 are changed continuously, realizing the stepless adjustment of the wind power level of the fan and changes continuously.

The main control circuit 3 controls the first driving circuit 2 to output a first rotating speed control signal according to the first electrical signal, thereby controlling the driving power output by the first motor 5 to be continuously increased to increase the rotational speed of the fan blades 9. The main control circuit 3 controls the first driving circuit 2 to output a second rotating speed control signal according to the second electrical signal, thereby controlling the driving power output by the first motor 5 to be continuously decreased to decrease the rotational speed of the fan blades 9.

Figure 16:
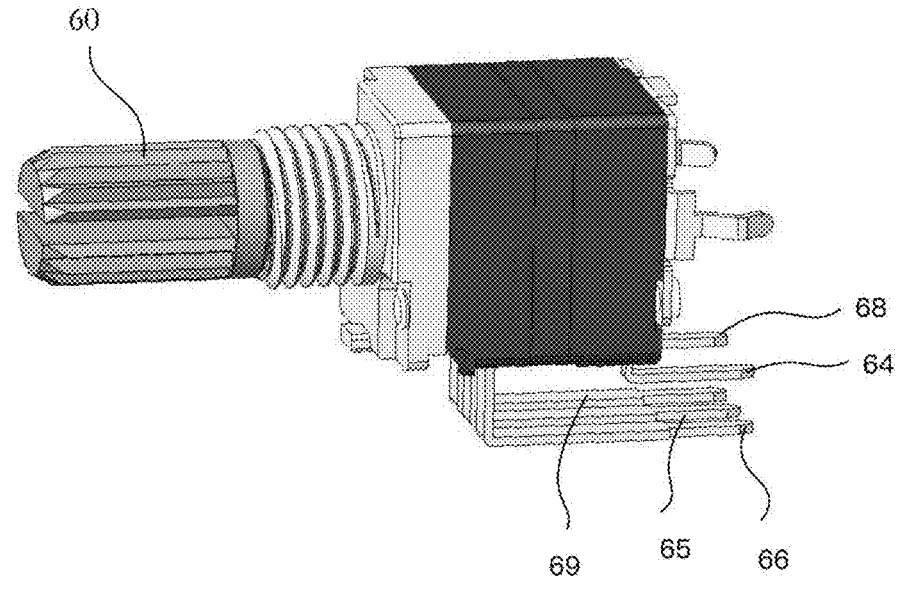
FIG. 16 is a schematic diagram of the stepless regulation element of an embodiment of the present invention.

Referring to FIG. 16, in this embodiment, the encoder switch further includes a first pin 66, a second pin 65, a third pin 64, a fourth pin 68 and a fifth pin 69. The third pin 64 is grounded. The fourth pin 68 is configured to receive an operating voltage. An operation being executed by the encoder switch includes a first adjustment operation and a second adjustment operation opposite to the first adjustment operation. When the encoder switch is configured to execute the first adjustment operation, the first pin 66 outputs the first electrical signal. When the encoder switch is configured to execute the second adjustment operation, the second pin 65 outputs the second electrical signal. It will be appreciated that the first adjustment operation can be a clockwise rotation operation, and the second adjustment operation can be a counterclockwise rotation operation.

The fifth pin 69 is electrically connected with the main control circuit 3, the operation being executed by the encoder switch further includes a turn-on operation and a turn-off operation. When the encoder switch is configured to execute the turn-on operation, the fifth pin 69 outputs a turn-on signal, whereby the main control circuit 3 controls the first motor 5 to start working according to the turn-on signal thereby driving the fan blades 9 to rotate. When the encoder switch is configured to execute the turn-off operation, the fifth pin 69 outputs a turn-off signal, whereby main control circuit controls the first motor 5 to stop working according to the turn-off signal thereby driving the fan blades 9 to stop rotating.

In this embodiment, the turn-on operation is the first time of the pressing operation of a count, and the turn-off operation is the second time of the pressing operation of the count. Therefore, pressing the encoder switch for the first time turn on the first motor 5, pressing the encoder switch for the second time turn off the first motor 5, when this process is cycle repeat, pressing the encoder switch again to turn on the first motor 5 and the next pressing the encoder switch to turn off the first motor 5.

In another embodiment, a first operation is a clockwise rotation operation, a second operation is a counterclockwise rotation operation. From the initial position (a turn-on position with the lowest power), the encoder switch is rotated clockwise to realize the first jump operation to turn on the first motor 5. From the maximum position (a turn-off position with the highest power or other position with a power greater than 0), the encoder switch is rotated counterclockwise to realize the second jump operation to turn off the first motor 5.

Figure 17:
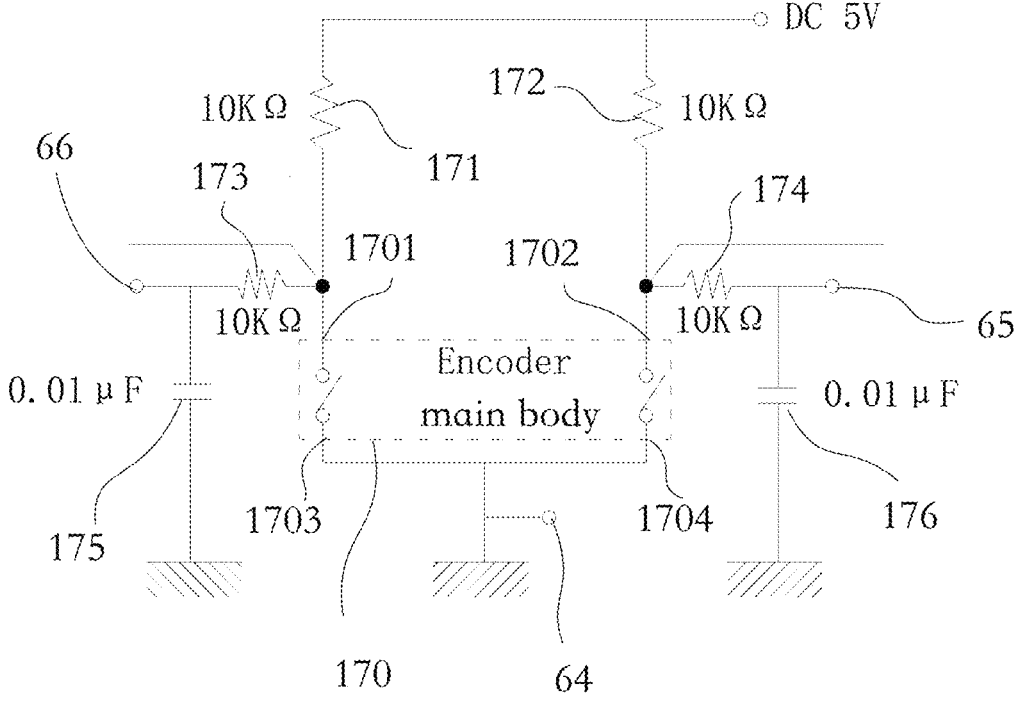
FIG. 17 is a circuit diagram of the stepless regulation element of an embodiment of the present invention.

Referring to FIG. 17, the FIG. 17 provides an equivalent circuit diagram of the encoder switch. The encoder switch further includes an encoder main body 170. The encoder main body 170 includes a first end 1701, a second end 1702, a third end 1703 and a fourth end 1704. The first end 1701 is connected with the first pin 66, the first end 1701 is electrically connected with an operating voltage end DC through a first resistor 171, The second end 1702 is connected with the second pin 65, the second end 1702 is electrically connected with the operating voltage end DC through a second resistor 172. The first pin 66 is grounded through a first capacitor 175. The second pin 65 is grounded through a second capacitor 176. A third resistor 173 is electrically connected between the first end 1701 and the first pin 66, and a fourth resistor 174 is electrically connected between the second end 1702 and the second pin 65.

By means of the encoder switch shown in FIG. 16 and FIG. 17, the power and rotational speed of the first motor 5 in the fan can be easily and stepless adjusted, thus realizing stepless adjustment of the fan's wind power. Compared with the existing only a few different gears (generally, there are less than 7 wind power adjustment gears), the encoder switch of the present invention can realize dozens or hundreds of gears of wind power adjustment, such as wind power adjustment gears from 1 to 100, the user can choose the gears based on their own needs, the user experience is better.

In the above embodiment, the control circuit board 200 further includes a power module 1 that is electrically connected to the main control circuit 3, the first driving circuit 2 and the stepless regulation element 6, respectively. The power module 1 is configured for supplying power to the main control circuit 3 and the first driving circuit 2, to make the circuits on the entire control circuit board 200 to operate.

In the above embodiment, the first driving circuit 2 includes a first switch transistor Q1. A grid electrode of the first switch transistor Q1 is connected to the main control circuit 3, a source electrode of the first switch transistor Q1 is grounded, a drain electrode of the first switch transistor Q1 is electrically connected to a negative electrode of the first motor 5, and an output terminal of the power module 1 is electrically connected to a positive electrode of the first motor 5. When the user turns on or off the fan through the stepless regulation element 6, the main control circuit 3 outputs a conduction or cutoff signal to the first switch transistor Q1 according to the signal fed back by the stepless regulation element 6, to achieve the turning on and off of a first electrode through the first switch transistor Q1. Moreover, when the user adjusts the stepless regulation element 6, the first switch transistor Q1 adjusts a duty cycle of a current passing through according to the rotating speed control signal output by the main control circuit 3, to control the current output to the first motors 5 and adjust the power output to the first motors 5.

In one embodiment, the first driving circuit 2 includes a boost regulation unit 23. The boost regulation unit 23 is electrically connected to the power module 1, the main control circuit 3, and the first motor 5, respectively. The boost regulation unit 23 boosts a voltage output by the power module 1 according to the rotating speed control signal output by the main control circuit 3 and then outputs the voltage to the first motor 5, to output a voltage and power suitable for the first motor 5.

Specifically, the boost regulation unit 23 includes a boost unit, a first inductor L2, and a first diode D2. The output terminal of the power module 1 is electrically connected to the positive electrode of the first motor 5 through the first inductor L2 and the first diode D2 in sequence. The boost unit is electrically connected to an output terminal of the first inductor L2. The boost unit conducts at a corresponding frequency according to the rotating speed control signal output by the main control circuit to charge and discharge the first inductor L2, to boost the voltage output by the power module 1 and output the voltage to the first motor 5.

In one embodiment, the boost unit includes a boost U3 and a plurality of regulating resistors 22. One end of each of the regulating resistors 22 is respectively electrically connected to the different pins of the main control circuit 3, and another end of each of the regulating resistors 22 is electrically connected to an enable pin of the boost chip U3. A switch pin of the boost chip U3 is electrically connected to the output terminal of the first inductor L2. A feedback pin of the boost chip U3 is further electrically connected to an output terminal of the first diode D2. An output pin of the boost chip U3 is connected to the output terminal of the first diode D2, and the enable pin of the boost chip U3 is electrically connected to the main control circuit 3.

The main control circuit 3 outputs the stepless regulation signal to the enable pin of the boost chip U3 according to the stepless regulation signal, and selects a plurality of regulating resistors 22 to output the electrical signal to the feedback pin of the boost chip U3. The boost chip U3 conducts an internal switch transistor at a corresponding frequency according to the stepless regulation signal input by the enable pin, to charge and discharge the first inductor L2, and to boost the voltage output by the power module 1. The output pin of the boost chip U3 adjusts the boosted voltage according to the electrical signal input by the feedback pin and then outputs the boosted voltage to the first motor 5. The main control circuit 3 outputs an electrical signal to the feedback pin of the boost chip U3 through the regulating resistor 22, so that the voltage output to the first motor 5 can be adjusted to obtain the voltage suitable for the first motor 5, to drive the first motor 5 to work.

Specifically, the total number of the regulating resistors 22 is twelve. In other embodiments, the total number of the regulating resistors 22 can be ten, thirteen, etc.

Figure 15:
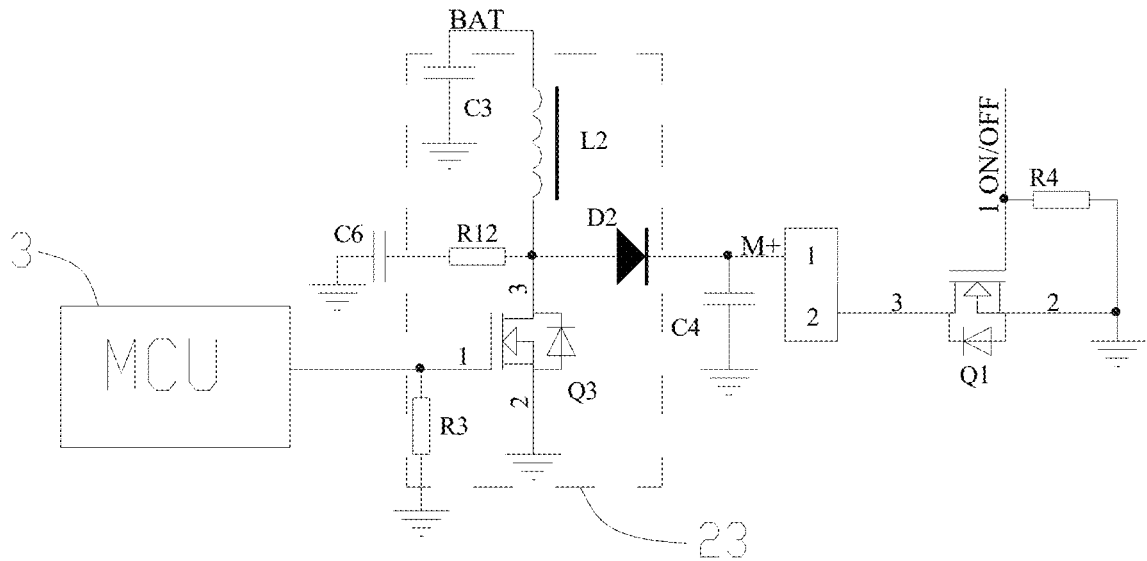
FIG. 15 is another circuit diagram of an electrical connection between a first driving circuit, the main control circuit, and a first interface of the present invention.

In another embodiment, as shown in FIG. 15, the boost unit includes a second switch transistor. A first end of the second switch transistor is electrically connected to the main control circuit 3, a second end of the second switch transistor is grounded, and a third end of the second switch transistor is electrically connected to the output terminal of the first inductor L2. The second switch transistor receives a PWM signal output by the main control circuit 3 for turning on and off, to boost and regulate the voltage output by the power module 1 through the first inductor L2. The first inductor L2 outputs the boosted voltage to the first motor 5 to obtain the voltage suitable for the first motor 5, so that the first motor 5 is driven to work.

Figure 5:
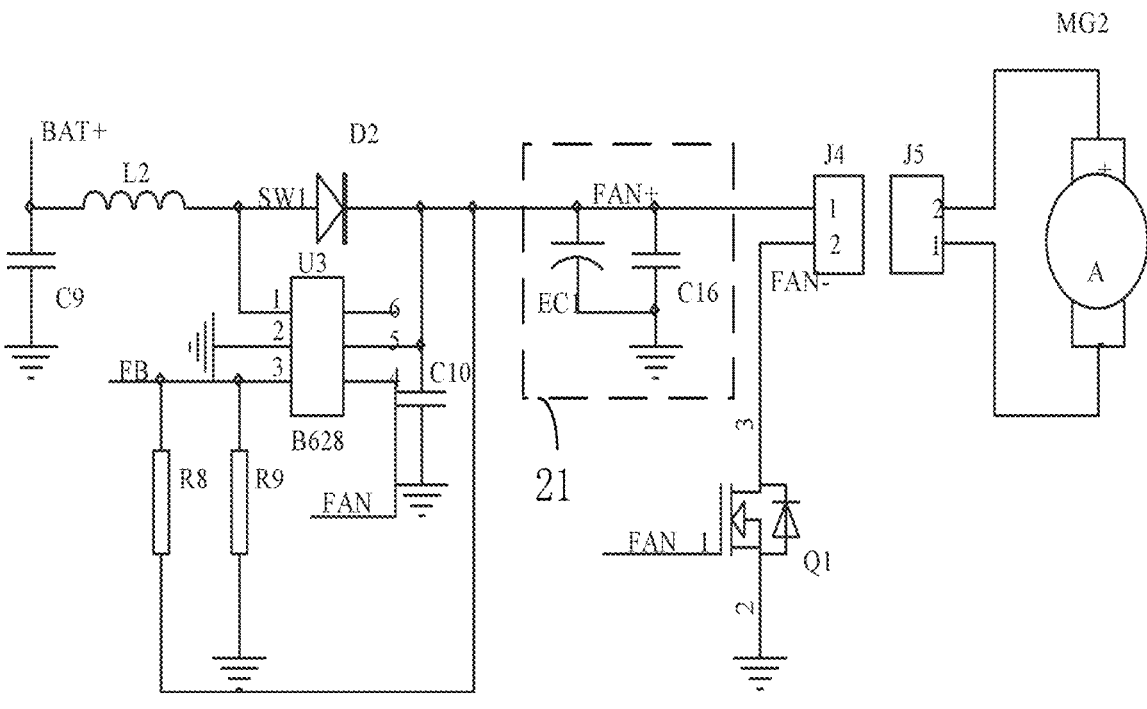
FIG. 5 is a partial circuit diagram of a first driving circuit of the present invention.
Figure 6:
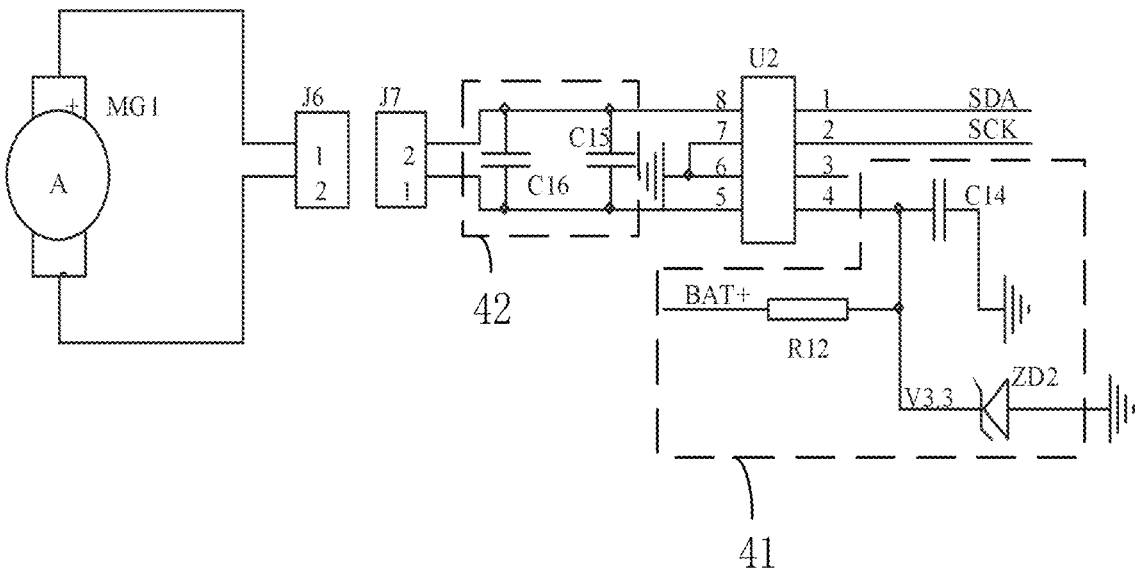
FIG. 6 is a circuit diagram of a second driving circuit of the present invention.

Referring to FIGS. 5-7, in the embodiments of the different boost units mentioned above, the first driving circuit 2 further include a first filtering unit 21. The first filtering unit 21 includes a filtering capacitor C16. One end of the filtering capacitor C16 is grounded, and another end of the filtering capacitor C16 is electrically connected to the output terminal of the first diode D2. Through the filtering capacitor C16, a stable voltage can be output to the first motor 5 after filtering.

In one embodiment, the first driving circuit 2 further includes a first interface J4. The first interface J4 is electrically connected to the first motor 5. A drain electrode of the first switch S2 is electrically connected to the negative electrode of the first motor 5 through the first interface J4, the output terminal of the power module 1 is electrically connected to the positive electrode of the first motor 5 through the first interface J4. By using the first interface J4, it is convenient for the control circuit board 200 to be electrically connected to the first motor 5 through a wiring terminal.

In one embodiment, the fan main body 100 includes an operating member 101. The operating member 101 is sleeved on the stepless regulation element 6, specifically, the operating member 101 is sleeved on an operation portion of the stepless regulation element 6, thereby the operation portion of the stepless regulation element 6 follows the operating member 101 to move when the operating member 101 is operated. The operating member 101 is arranged on the fan main body 100 through one of the ways of rotating, rolling, and sliding.

Specifically, when the stepless regulation element 6 is a rotary potentiometer or digital encoder, the operating member 101 can be connected to a knob on the stepless regulation element 6, when the operating member 101 rotates or rolls, the knob can rotate together to adjust the stepless regulation element 6. When the stepless regulation element 6 is a sliding resistor, the operating member 101 is arranged on a sliding element on the sliding resistor, hereby a resistance of the regulating resistor 22 can be adjusted when the operating member 101 slides.

In one embodiment, the fan main body 100 includes a fan head 8, a supporting base 10, and a second motor 7 for controlling rotation of the fan head 8. The first motors 5 and the fan blades 9 are both disposed on the fan head 8, the second motor 7 is disposed on the supporting base 10 or the fan head 8, and the control circuit board 200 is disposed on the fan head 8 or the supporting base 10. The control circuit board 200 further includes a second driving circuit 4 and a first switch S2 both electrically connected to the main control circuit 3. The second driving circuit 4 is electrically connected to the power module 1 and the second motor 7, respectively. The main control circuit 3 drives the second motor 7 to operate through the second driving circuit 4 according to an electrical signal fed back by the first switch S2. Specifically, when the second motor 7 is arranged on the supporting base 10, a rotating shaft of the second motor 7 is connected to the fan head 8, when the user operates the first switch S2, the second driving circuit 4 drives the second motor 7 to rotate through an electrical signal output by the main control circuit 3, thereby driving the fan head 8 to rotate. When the second motor 7 is arranged on the fan head 8, the rotating shaft of the second motor 7 is fixed on the supporting base 10. When the second motor 7 is driven, the fan head 8 can be driven to rotate by a reaction force.

In one embodiment, the second driving circuit 4 includes a motor driving chip U2, a second filtering unit 41, a third filtering unit 42, and a second interface J7. The second filtering unit 41 is electrically connected to the output terminal of the power module 1 and the motor driving chip U2, respectively. The second filtering unit 41 is configured for filtering the voltage output by the power module 1 and then supplying the voltage to the motor driving chip U2. The third filtering unit 42 is electrically connected to the motor driving chip U2 and the second interface J7, respectively. The second interface J7 is electrically connected to the second motor 7. The third filtering unit 42 is configured for filtering a driving voltage output by the motor driving chip U2 and then supplying the driving voltage to the second motor 7. A sixth pin and a seventh pin of the motor driving chip U2 are both grounded. A SDA pin and a SCK pin on the motor driving chip U2 are electrically connected to the main control circuit 3 respectively. Through the second interface J7, it is convenient for the control circuit board 200 to be electrically connected to the second motor 7 through the wiring terminal. Moreover, the motor driving chip U2 can drive the second motor 7 to operate through the signal output by the main control circuit 3, achieving the shaking of the fan head 8.

In the above embodiment, the motor driving chip U2 can be a chip of 118S model, and the main control circuit 3 can be a chip of AD156B model.

In one embodiment, the stepless regulation element 6 is a press switch encoder, and the first switch S2 is a switch on the press switch encoder, that is, the switch on the press switch encoder is electrically connected to the main control circuit 3. When the user presses the encoder, the switch on the encoder is closed. After the main control circuit 3 detects that the switch is closed, the main control circuit 3 outputs a driving signal to the motor driving chip U2 to control the operation of the second motor 7.

In one embodiment, the power module 1 includes a power interface 14 for connecting to a power supply and a power circuit 13 electrically connected to the power interface 14. The power circuit 13 is respectively electrically connected to the main control circuit 3, the first driving circuit 2, the second driving circuit 4, and the stepless regulation element 6, to process the power input from the power interface 14 and then supply power to the main control circuit 3, the first driving circuit 2, the second driving circuit 4, and the stepless regulation element 6.

In one embodiment, the power module 1 further includes a battery 12 electrically connected to the power circuit 13.

The power circuit 13 is a charging and discharging circuit configured for charging the battery 12 with the power input from the power interface 14. By using the power circuit 13, the charging and discharging of the battery 12 can be achieved.

In one embodiment, the power circuit 13 includes a charging and discharging chip U4. The charging and discharging chip U4 are electrically connected to the power interface 14 and a positive electrode of the battery 12, respectively. The charging and discharging chip U4 are electrically connected to the main control circuit 3 for detecting the temperature of the main control circuit 3.

In one embodiment, the power module 1 further includes a battery protection circuit 11 electrically connected to the power circuit 13 and the battery 12, respectively. The battery protection circuit 11 stops charging the battery 12 when the battery 12 is overcharged or stops the battery 12 from continuing to output voltage when the battery 12 is over discharged, playing a role in protecting the battery 12 and preventing overcharging or over discharging from shortening the lifespan of the battery 12.

In one embodiment, the control circuit board 200 further includes a power indication circuit 31 electrically connected to the main control circuit 3. When the power interface 14 is connected to a power supply, the power circuit 13 feeds back a signal to the main control circuit 3. The main control circuit 3 controls the power indication circuit 31 to give an instruction according to the signal fed back by the power circuit 13 to remind the user that the fan is powered on normally.

Specifically, the power circuit 13 includes a charging and discharging chip U4, a fifth resistor R1, a fourth capacitor C3, and a fifth capacitor C4. A second pin of the charging and discharging chip U4 is grounded through the fifth resistor R1, a fourth pin of the charging and discharging chip U4 is grounded through the fourth capacitor C3, and a fifth pin of the charging and discharging chip U4 is grounded through the fifth capacitor C4. The positive electrode of the battery 12 is electrically connected to the fifth pin of the charging and discharging chip U4, and a seventh pin of the charging and discharging chip U4 is electrically connected to the main control circuit 3 for detecting the temperature of the main control circuit 3. The power interface 14 is a Type-C interface, and the charging and discharging chip U4 is a chip of 4056 model, which can be specifically a chip of TP4056, AXS4056 and other models, to achieve charging and discharging of the battery 12.

The battery protection circuit 11 includes a battery protection chip U5, a sixth capacitor C8, and a sixth resistor R6. A first pin of the battery protection chip U5 is connected to a third pin of the battery protection chip U5 through the sixth capacitor C8. The third pin of the battery protection chip U5 is connected to the fifth pin of the charging and discharging chip U4 through the sixth resistor R6. A second pin of the battery protection chip U5 is connected to its own first pin. The second pin of the battery protection chip U5 is further connected to a negative electrode of the battery 12. A fourth pin and a fifth pin of the battery protection chip U5 are both grounded. The battery protection chip U5 can be a chip of 5352 model.

In one embodiment, the second filtering unit 41 includes a fourth resistor R12, a second capacitor C14, and a second diode ZD2. An output terminal of the power circuit 13 is connected to a fourth pin of the motor driving chip U2 through the fourth resistor R12, the fourth pin of the motor driving chip U2 is grounded through the second capacitor C14. the positive electrode of the second diode ZD2 is grounded, and the negative electrode of the second diode ZD2 is electrically connected to the fourth pin of the motor driving chip U2. The voltage output by the power circuit 13 is reduced by the fourth resistor R12 and stabilized by the second diode ZD2 to supply power to the motor driving chip U2.

In one embodiment, the third filtering unit 42 includes a third capacitor C15. One end of the third capacitor C15 is electrically connected to the second interface J7 and an eighth pin of the motor driving chip U2, and another end of the third capacitor C15 is respectively electrically connected to the second interface J7 and a fifth pin of the motor driving chip U2. The voltage output by the motor driving chip U2 is filtered by the third capacitor C15 and then supplied to the second motor 7 for use through the second interface J7, to prevent noise waves from affecting the stability of the operation of the second motor 7.

Figure 12:
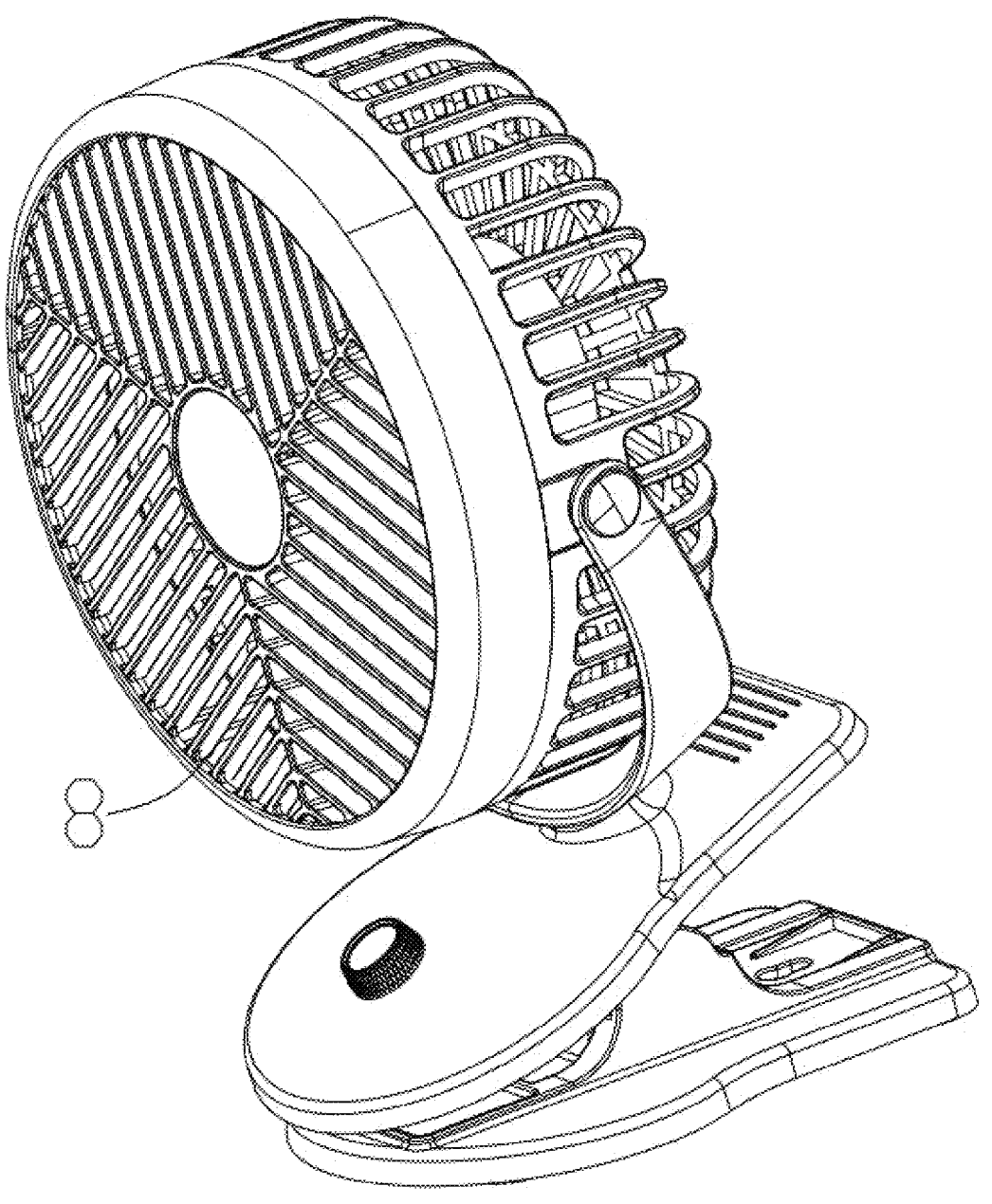
FIG. 12 is a schematic diagram of the fan according to an embodiment of the present invention.
Figure 13:
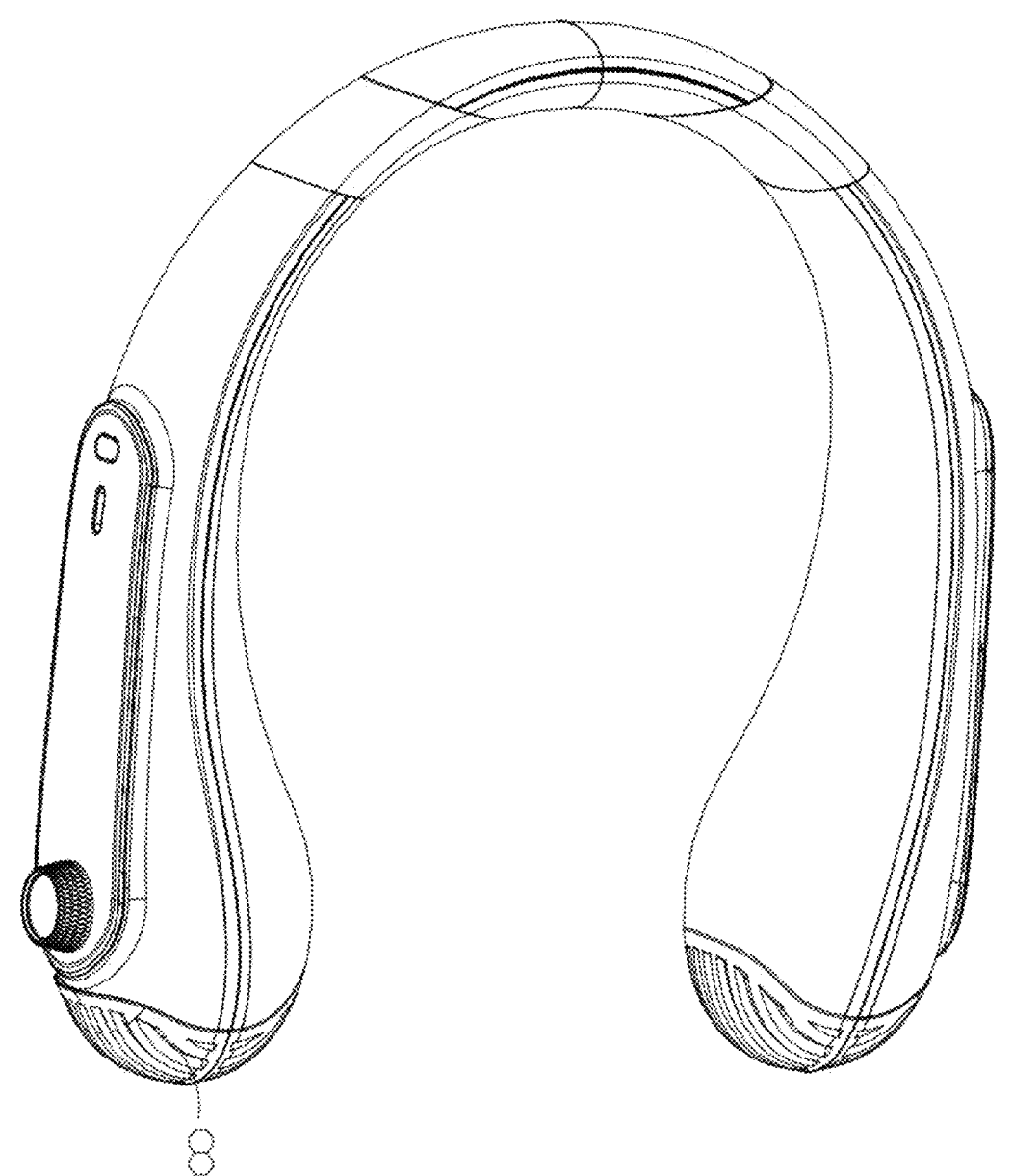
FIG. 13 is a schematic diagram of the fan according to an embodiment of the present invention.
Figure 14:
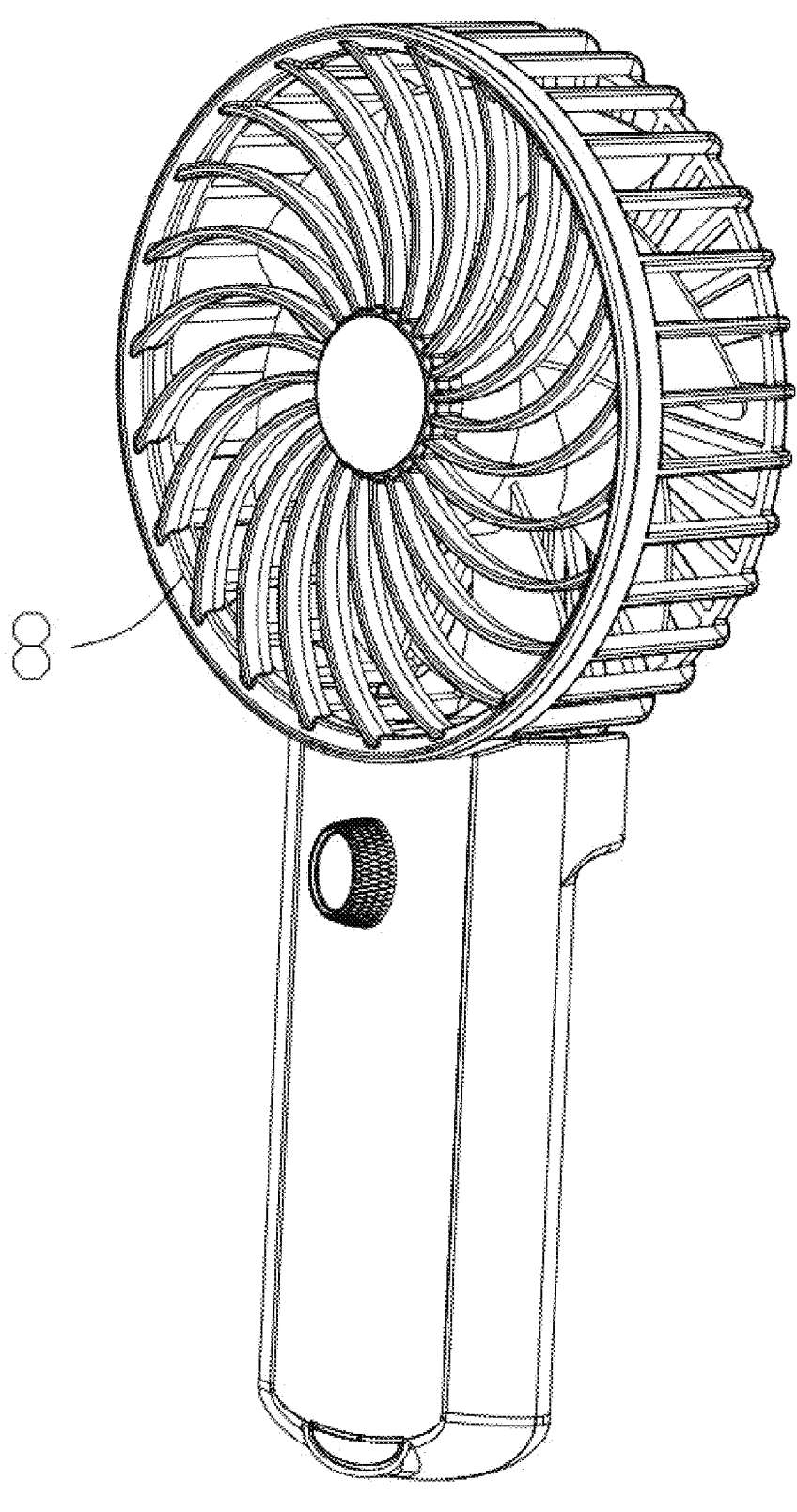
FIG. 14 is a schematic diagram of the fan according to an embodiment of the present invention.

In the above embodiments, the circuit on the control circuit board 200 can be applied to a handheld fan (as shown in FIG. 14), a clamped fan (as shown in FIG. 12), or in embodiments without the second motor 7. The control circuit can be applied to a neck fan (as shown in FIG. 13), etc.

The above description only describes embodiments of the present invention, and is not intended to limit the present disclosure; various modifications and changes can be made to the present invention. Any modifications, equivalent substitutions, and improvements made within the spirit and scope of the present disclosure are intended to be included within the scope of the present invention.

What is claimed is:

1. A stepless regulation fan, comprising a fan main body, a main control circuit, a stepless regulation element and a first driving circuit, wherein the fan main body comprises a first motor and fan blades connected to the first motor, the main control circuit is electrically connected with the stepless regulation element and the first driving circuit respectively; the first driving circuit is electrically connected to the first motor;

the stepless regulation element comprises an encoder switch, the encoder switch comprises a first pin and a second pin, the first pin and the second pin are electrically connected with the main control circuit;

when the encoder switch is operated, the first pin or the second pin feeds back a first electrical signal or a second electrical signal to the main control circuit, the main control circuit controls the first driving circuit to output a rotating speed control signal according to the first electrical signal or the second electrical signal, thereby controlling the continuous change of the driving power output by the first motor;

wherein the main control circuit controls the first driving circuit to output a first rotating speed control signal according to the first electrical signal, thereby controlling the driving power output by the first motor to be continuously increased to increase the rotational speed of the fan blades; the main control circuit controls the first driving circuit to output a second rotating speed control signal according to the second electrical signal, thereby controlling the driving power output by the first motor to be continuously decreased to decrease the rotational speed of the fan blades;

wherein the encoder switch further comprises a fifth pin, the fifth pin is electrically connected with the main control circuit, the operation being executed by the encoder switch further comprises a turn-on operation and a turn-off operation, when the encoder switch is configured to execute the turn-on operation, the fifth pin outputs a turn-on signal, whereby the main control circuit controls the first motor to start working according to the turn-on signal thereby driving the fan blades to rotate;

when the encoder switch is configured to execute the turn-off operation, the fifth pin outputs a turn-off signal, whereby the main control circuit controls the first motor to stop working according to the turn-off signal thereby driving the fan blades to stop rotating.

2. The stepless regulation fan according to claim 1, wherein the encoder switch further comprises a third pin and a fourth pin, the third pin is grounded, the fourth pin is configured to receive an operating voltage; an operation being executed by the encoder switch comprises a first adjustment operation and a second adjustment operation opposite to the first adjustment operation, when the encoder switch is configured to execute the first adjustment operation, the first pin outputs the first electrical signal; when the encoder switch is configured to execute the second adjustment operation, the second pin outputs the second electrical signal.

3. The stepless regulation fan according to claim 2, wherein a first operation is a clockwise rotation operation, a second operation is a counterclockwise rotation operation; the turn-on operation and the turn-off operation are both a pressing operation, the turn-on operation is the first time of the pressing operation of a count, and the turn-off operation is the second time of the pressing operation of the count.

4. The stepless regulation fan according to claim 2, wherein a first operation is a clockwise rotation operation, a second operation is counterclockwise rotation operation; the turn-on operation is a first jump operation based on the continuous rotation of the first operation, and the turn-off is a second jump operation based on the continuous rotation of the second operation.

5. The stepless regulation fan according to claim 2, wherein the encoder switch further comprises an encoder main body, the encoder main body comprises a first end, a second end, a third end and a fourth end, the first end is connected with the first pin, the first end is electrically connected with an operating voltage end through a first resistor, the second end is connected with the second pin, the second end is electrically connected with the operating voltage end through a second resistor, the first pin is grounded through a first capacitor, the second pin is grounded through a second capacitor, a third resistor is electrically connected between the first end and the first pin, and a fourth resistor is electrically connection between the second end and the second pin.

6. The stepless regulation fan according to claim 1, wherein the first driving circuit comprises a first switch transistor, a grid electrode of the first switch transistor is connected to the main control circuit, a source electrode of the first switch transistor is grounded, a drain electrode of the first switch transistor is electrically connected to a negative electrode of the first motor, an output terminal of the power module is electrically connected to a positive electrode of the first motor; and the first switch transistor adjusts the power output to the first motor according to the rotating speed control signal output by the main control circuit.

7. The stepless regulation fan according to claim 6, wherein the first driving circuit comprises a boost regulation unit; the boost regulation unit is electrically connected to the power module, the main control circuit and the first motor respectively, the boost regulation unit boosts a voltage output by the power module according to the rotating speed control signal output by the main control circuit and then outputs the voltage to the first motor.

8. The stepless regulation fan according to claim 6, wherein the boost regulation unit comprises a boost unit, a first inductor and a first diode;

an output terminal end of the power module is electrically connected to a positive electrode of the first motor through the first inductor and the first diode in sequence, the boost unit is electrically connected to an output terminal of the first inductor;

the boost unit conducts at a corresponding frequency according to the rotating speed control signal output by the main control circuit to charge and discharge the first inductor, to boost the voltage output by the power module and output the voltage to the first motor.

9. The stepless regulation fan according to claim 8, wherein the boost unit comprises a boost chip and a plurality of regulating resistors, one end of each of the regulating resistors is respectively electrically connected to a different pin of the main control circuit, another end of each of the regulating resistors is electrically connected to an enable pin of the boost chip;

a switch pin of the boost chip is electrically connected to the output terminal of the first inductor, a feedback pin of the boost chip is further electrically connected to an output terminal of the first diode, an output pin of the boost chip is connected to the output terminal of the first diode, the enable pin of the boost chip is electrically connected to the main control circuit;

the main control circuit outputs a stepless regulation signal to the enable pin of the boost chip according to the stepless regulation signal, then selects a plurality of regulating resistors to output an electrical signal to the feedback pin of the boost chip; the boost chip conducts an internal switch transistor at a corresponding frequency according to the stepless regulation signal output by the enable pin, to charge and discharge the first inductor, to boost the voltage output by the power module; the output pin of the boost chip adjusts the boosted voltage according to the electrical signal input from the feedback pin, and then outputs the boosted voltage to the first motor.

10. The stepless regulation fan according to claim 8, wherein the boost unit comprises a second switch transistor, a first end of the second switch transistor is electrically connected to the main control circuit, a second end of the second switch transistor is grounded, a third end of the second switch transistor is electrically connected to the output terminal of the first inductor;

the second switch transistor receives a PWM signal output by the main control circuit for turning on and off, to boost and regulate the voltage output by the power module through the first inductor; and the first inductor outputs the boosted voltage to the first motor.

11. The stepless regulation fan according to claim 6, wherein the first driving circuit further comprises a first interface, the first interface is electrically connected to the first motor; a drain electrode of the first switch is electrically connected to the negative electrode of the first motor through the first interface, and an output terminal of the power module is electrically connected to the positive electrode of the first motor through the first interface.

12. The stepless regulation fan according to claim 8, wherein the first driving circuit further comprises a first filtering unit, the first filtering unit comprises a filtering capacitor, one end of the filtering capacitor is grounded, and another end of the filtering capacitor is respectively electrically connected to the first interface and the output terminal of the first diode.

13. The stepless regulation fan according to claim 1, wherein the fan main body comprises an operating member, the operating member is sleeved on an operating portion of the stepless regulation element, the operating portion of the stepless regulation element follows the operating member to move when the operating member is operated;

the operating member is arranged on the fan main body through one of the ways of rotating, rolling, and sliding.

14. The stepless regulation fan according to claim 1, wherein the fan main body comprises a fan head, a supporting base and a second motor for controlling rotation of the fan head; the first motor and the fan blades are both disposed on the fan head, the second motor is disposed on the supporting base or the fan head, and the control circuit board is disposed on the fan head or the supporting base;

the control circuit board further comprises a second driving circuit and a first switch both electrically connected to the main control circuit; the second driving circuit is electrically connected to the power module and the second motor respectively; and the main control circuit drives the second motor to operate through the second driving circuit according to an electrical signal fed back by the first switch.

15. The stepless regulation fan according to claim 12, wherein the second driving circuit comprises a motor driving chip, a second filtering unit, a third filtering unit and a second interface; the second filtering unit is electrically connected to an output terminal of the power circuit and the motor driving chip respectively; the second filtering unit is configured for filtering a voltage output by the power circuit and then supplying the voltage to the motor driving chip; the third filtering unit is electrically connected to the motor driving chip and the second interface respectively; the second interface is electrically connected to the second motor, the third filtering unit is configured for filtering a driving voltage output by the motor driving chip and then supplying the driving voltage to the second motor, at least one pin of the motor driving chip is grounded, and a SDA pin and a SCK pin on the motor driving chip are respectively electrically connected to the main control circuit.

16. The stepless regulation fan according to claim 15, wherein the power module further comprises a battery electrically connected to the power circuit; the power circuit is a charging and discharging circuit configured to charge the battery with the power input from the power interface;

the power circuit comprises a charging and discharging chip; the charging and discharging chip is electrically connected to the power interface and a positive electrode of the battery respectively; and the charging and discharging chip is electrically connected to the main control circuit for detecting a temperature of the main control circuit.

17. The stepless regulation fan according to claim 16, wherein the power module further comprises a battery protection circuit electrically connected to the power circuit and the battery respectively; the battery protection circuit stops charging the battery when the battery is overcharged or stops the battery from continuing to output voltage when the battery is over discharged, and the battery protection circuit comprises a battery protection chip electrically connected to the battery.

18. The stepless regulation fan according to claim 15, wherein the control circuit board further comprises a power indication circuit electrically connected to the main control circuit; when the power interface is connected to a power supply, the power circuit feeds back a signal to the main control circuit, and the main control circuit controls the power indication circuit to give an instruction according to the signal fed back by the power circuit.

19. A stepless regulation fan, comprising a fan main body, a main control circuit, a stepless regulation element and a first driving circuit, wherein the fan main body comprises a first motor and fan blades connected to the first motor, the main control circuit is electrically connected with the stepless regulation element and the first driving circuit respectively; the first driving circuit is electrically connected to the first motor;

the stepless regulation element comprises an encoder switch, the encoder switch comprises a first pin and a second pin, the first pin and the second pin are electrically connected with the main control circuit;

when the encoder switch is operated, the first pin or the second pin feeds back a first electrical signal or a second electrical signal to the main control circuit, the main control circuit controls the first driving circuit to output a rotating speed control signal according to the first electrical signal or the second electrical signal, thereby controlling the continuous change of the driving power output by the first motor;

wherein the encoder switch further comprises an encoder main body, the encoder main body comprises a first end, a second end, a third end and a fourth end, the first end is connected with the first pin, the first end is electrically connected with an operating voltage end through a first resistor, the second end is connected with the second pin, the second end is electrically connected with the operating voltage end through a second resistor, the first pin is grounded through a first capacitor, the second pin is grounded through a second capacitor, a third resistor is electrically connected between the first end and the first pin, and a fourth resistor is electrically connection between the second end and the second pin.

* * * * *